United States Patent [19]

Yamauchi

[11] Patent Number: 5,252,961
[45] Date of Patent: Oct. 12, 1993

[54] SYSTEM FOR MONITORING STATUS OF PLURALITY OF REPEATERS

[75] Inventor: Daiichiro Yamauchi, Yokohama, Japan

[73] Assignee: Fujitsu Limited, Kawasaki, Japan

[21] Appl. No.: 794,853

[22] Filed: Nov. 21, 1991

Related U.S. Application Data

[63] Continuation of Ser. No. 309,151, Feb. 13, 1989, abandoned.

[30] Foreign Application Priority Data

Feb. 12, 1988 [JP] Japan ................................. 63-31354

[51] Int. Cl.$^5$ ............................................. H04Q 3/00
[52] U.S. Cl. ........................... 340/825.07; 340/825.16
[58] Field of Search ..................... 340/825.07, 825.08, 340/825.16, 825.52, 425; 370/13, 13.1, 14; 371/20.1, 20.2; 375/3, 3.1; 455/7, 9; 379/1, 4

[56] References Cited

U.S. PATENT DOCUMENTS

| | | | |
|---|---|---|---|
| 3,917,916 | 11/1975 | Ghosh et al. | 375/3.1 |
| 4,278,850 | 7/1981 | Sato et al. | 370/13.1 |
| 4,406,919 | 9/1983 | Pospischill | 370/13.1 |
| 4,896,317 | 1/1990 | Nakama et al. | 370/13.1 |

FOREIGN PATENT DOCUMENTS

58-172044 10/1983 Japan .
62-59430 3/1987 Japan .
62-98837 5/1987 Japan .

*Primary Examiner*—Donald J. Yusko
*Assistant Examiner*—Edwin C. Holloway, III
*Attorney, Agent, or Firm*—Staas & Halsey

[57] ABSTRACT

A system for monitoring the status of a plurality of repeaters located along a transmission line connecting two terminal stations, wherein data is transmitted between the two terminal stations through the plurality of repeaters, in the form of a multiframe consisting of a group of consecutive frames, each of the consecutive frames in the multiframe transmitting an address of the corresponding repeater, respectively, and the status of each of the repeaters being written in the corresponding frame when each of the repeaters has received the corresponding one of the consecutive frames.

10 Claims, 15 Drawing Sheets

→ PRESENT INVENTION
→ PRIOR ART

⟹ PRESENT INVENTION

→ PRIOR ART

→ PRESENT INVENTION

→ PRIOR ART

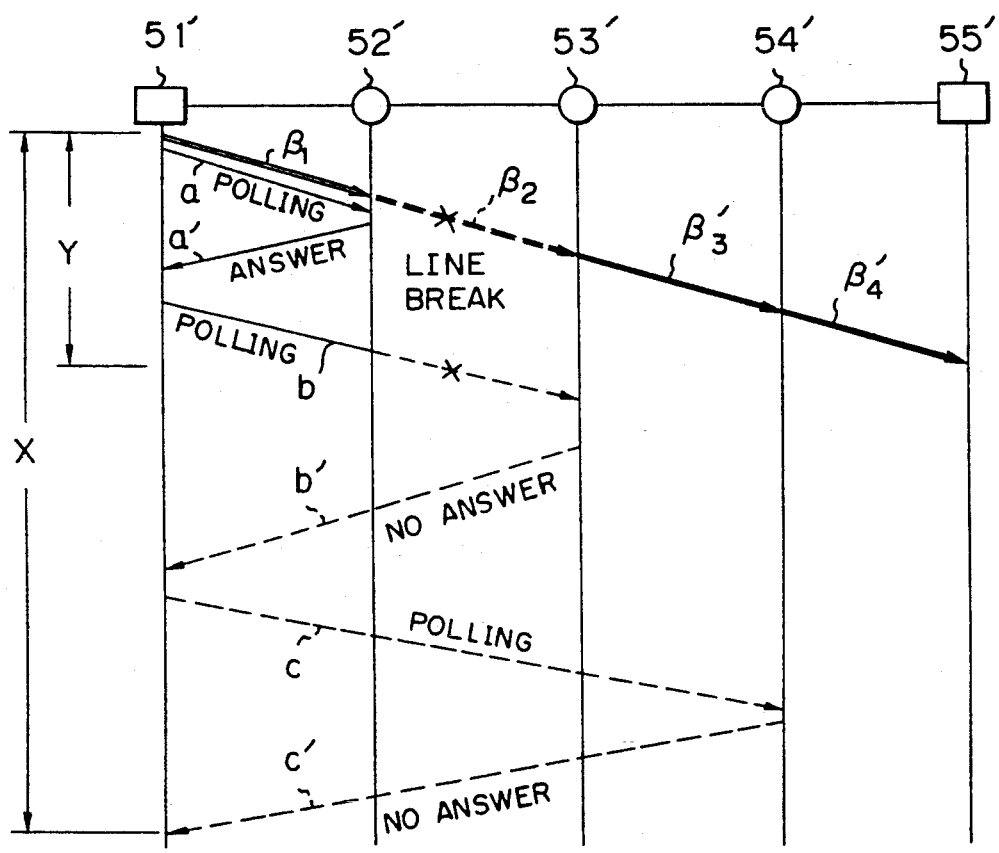

⟹ PRESENT INVENTION

→ PRIOR ART

Fig. 12

F1
- | FRM | DATA 1 | DATA 2 | DATA 3 | - - - - - | DATA 8 |
- | ADD 1 | DATA 9 | | - - - - | | DATA 16 |
- | SB 1 | DATA 17 | | - - - - | | DATA 24 |

F2
- | FRM | DATA 1 | | - - - - | | DATA 8 |
- | ADD 2 | DATA 9 | | - - - - | | DATA 16 |
- | SB 2 | DATA 17 | | - - - - | | DATA 24 |

⋮

Fi
- | FRM | DATA 1 | DATA 2 | DATA 3 | - - - - - | DATA 8 |
- | ADD i | DATA 9 | | - - - - | | DATA 16 |
- | SB i | DATA 17 | | - - - - | | DATA 24 |

⋮

Fn
- | FRM | DATA 1 | | - - - - | | DATA 8 |
- | ADD n | DATA 9 | | - - - - | | DATA 16 |
- | SB n | DATA 17 | | - - - - | | DATA 24 |

Fig. 13

$F_1'$:
| FRM | DATA 1 | DATA 2 | DATA 3 | - - - - | DATA 8 |
| SB 11 | DATA 9 | - - - - | | | DATA 16 |
| SB 12 | DATA 17 | - - - - | | | DATA 24 |
| SB 13 | DATA 25 | - - - - | | | DATA 32 |

$F_2'$:
| FRM | DATA 1 | - - - - | | | DATA 8 |
| SB 21 | DATA 9 | - - - - | | | DATA 16 |
| SB 22 | DATA 17 | - - - - | | | DATA 24 |
| SB 23 | DATA 25 | - - - - | | | DATA 32 |

$F_i'$:
| FRM | DATA 1 | DATA 2 | DATA 3 | - - - - | DATA 8 |
| SBi1 | DATA 9 | - - - - | | | DATA 16 |
| SBi2 | DATA 17 | - - - - | | | DATA 24 |
| SBi3 | DATA 25 | - - - - | | | DATA 32 |

$F_n'$:
| FRM | DATA 1 | - - - - | | | DATA 8 |
| SBn1 | DATA 9 | - - - - | | | DATA 16 |
| SBn2 | DATA 17 | - - - - | | | DATA 24 |
| SBn3 | DATA 25 | - - - - | | | DATA 32 |

SYSTEM FOR MONITORING STATUS OF PLURALITY OF REPEATERS

This application is a continuation of application Ser. No. 07/309,151, filed Feb. 13, 1989, now abandoned.

BACKGROUND OF THE INVENTION

(1) Field of the Invention

The present invention relates to a system for monitoring the status of a plurality of repeaters located along transmission lines connecting terminal stations in a communication system.

(2) Description of the Related Art

Generally, in a communication system, wherein terminal stations are connected by transmission lines for data transmission, repeaters are located along the data transmission lines, and data is transmitted through the transmission lines by using the repeaters.

Each repeater in the communication system as mentioned above, usually is provided with the function of detecting and indicating the status of the operation and an alarm status of the repeater itself, e.g., an alarm status showing a power failure, a removable unit has been removed, or a break in an input line (hereinafter all of the above statuses are called as the repeater status).

Further, the current status of the repeaters located along a transmission line must be known to the terminal stations carrying out data transmissions through the transmission line by using the repeaters, i.e., the terminal stations must monitor the status of each repeater.

FIG. 1 shows a typical arrangement of a two-way digital data transmission system constructed between two terminal stations.

In FIG. 1, reference numerals 51 and 55 denote two terminal stations connected by transmission lines 56, 57, whereby a data transmission can be made in both directions. Reference numerals 52, 53, and 54 each respectively denote a two-way repeater, located along the transmission lines 56 and 57.

In a conventional method for monitoring the status of a plurality of repeaters located along the transmission lines connecting two terminal stations, one or each of the terminal stations 51 and 55 sends a polling signal (status request signal) to determine the status of each of the repeaters, receives an answer to the polling signal from each repeater individually, and thus collect the current status information from all of the repeaters.

The timing of the monitoring operation when the above mentioned conventional method for monitoring the status of repeaters is applied to the construction of FIG. 1, is shown in FIG. 2, and can be compared with the timing of the method of the present invention, which will be explained later.

In FIG. 2, the horizontal plane corresponds to a geometrical extension from the terminal station 51 to the terminal station 55 along the transmission lines 56 and 57 in FIG. 1, and the vertical plane corresponds to a direction of the progress of time. The arrows a, a', b, b', c, and c' indicated by a thinner line each show a signal (or data) transmitted by the above mentioned conventional method for monitoring a status of repeaters, where a, b, and c correspond to the aforementioned polling signals (status request signals) sent to the repeaters 52, 53, and 54, and a', b', and c' correspond to the aforementioned answers to the polling signals from the repeaters 52, 53, and 54, respectively.

The timing of the monitoring operation when the above mentioned conventional method for monitoring the status of repeaters is applied to the construction of FIG. 1, is shown in FIGS. 2 and 3. FIG. 2 shows the timing when a break has not occurred in the transmission lines, and FIG. 3 shows the timing when a break has occurred in a line in the construction of FIG. 1, for example, between the repeaters 52 and 53 on the transmission line 56. In FIGS. 2 and 3, the timing of the monitoring operation by the present invention is also shown and is explained later as a comparison with the conventional method described herein.

When a break does not occur in the transmission lines in the construction of FIG. 1, the operation of polling and receiving the answer to the polling by the terminal stations 51 is repeated for each of the repeaters 52, 53, and 54, and thus the terminal station can obtain the current status of all of the repeaters in the time "X", as shown in FIG. 2.

In the above mentioned conventional method for monitoring a status of repeaters, however, it takes a long time to collect the current status information from a plurality of repeaters located along a transmission line because the polling operation must be carried out at all of the repeaters on a one by one basis, as shown in FIG. 2.

In the above mentioned conventional method for monitoring a status of repeaters, if a break in a transmission line occurs in the construction of FIG. 1, for example, between the repeaters 52 and 53 on the transmission line 56, as shown in FIG. 3, the terminal station 51 receives the answer a' from the repeater 52 corresponding to the polling signal a from the terminal station 51, but does not receive the answers b' or c' from the repeaters 53 and 54, due to the line break. Therefore, throughout these operations, the terminal station 51 judges that a malfunction has occurred between the repeaters 52 and 53.

However, in the above conventional method, when a break has occurred in a transmission line, great inconvenience is caused because of the long time needed to determine whether or not a break has occurred between the terminal stations, and where the break has occurred.

SUMMARY OF THE INVENTION

The object of the present invention is to provide a system for monitoring the status of a plurality of repeaters located along a transmission line, wherein a time needed to collect the current status information from a plurality of repeaters is reduced, and in particular, the occurrence of a malfunction can be quickly determined at a terminal station.

Therefore, according to the present invention, there is provided a system for monitoring a status of a plurality of repeaters wherein: at least one of the terminal stations comprises a multiframe generating means which generates data in a form of a multiframe consisting of a group of consecutive frames, an address of each of the repeaters being included in the corresponding one of the consecutive frames; and each of the repeaters comprises an address detecting means which detects the own address of the repeater in one frame among the consecutive frames, to determine a receipt of the corresponding frame among the consecutive frames, and an information adding means which writes the current status of the repeaters in the frame which includes the own address of the repeater, when the repeater receives that corresponding consecutive frame.

BRIEF DESCRIPTION OF THE DRAWINGS

In the drawings:

FIG. 8 shows a timing of collecting the current status information by the method for monitoring the status of a plurality of repeaters according to the second embodiment of the present invention when applied to the construction of FIG. 4, compared with the timing in the conventional method;

FIGS. 12 and 13 show examples of the formats of the multiframe in the present invention;

DESCRIPTION OF THE PREFERRED EMBODIMENTS

The first embodiment of the present invention is a system of monitoring a status of a plurality of repeaters located along a transmission line connecting two terminal stations, and is applied to a system having two terminal stations connected to each other by a one-way transmission line, and a plurality of repeaters located along the transmission line.

Figure 4:
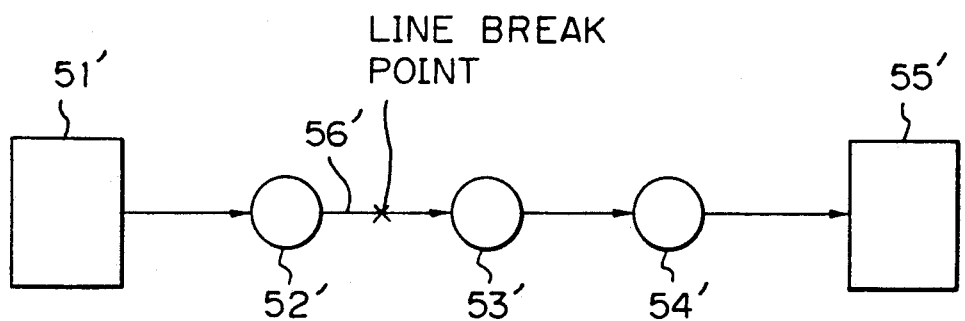
FIG. 4 shows a typical arrangement of a one-way digital data transmission system constructed between two terminal stations.

FIG. 4 shows a typical arrangement of a one-way digital data transmission system constructed between two terminal stations, to which the first embodiment of the present invention is applied.

In FIG. 4, reference numerals 51' and 55' denote two terminal stations connected by a one-way transmission lines 56', whereby a data transmission can be made in one direction from the terminal station 51' to 55'. Reference numerals 52', 53', and 54' each respectively denote a one-way repeater, located along the transmission line 56'.

Figure 5:
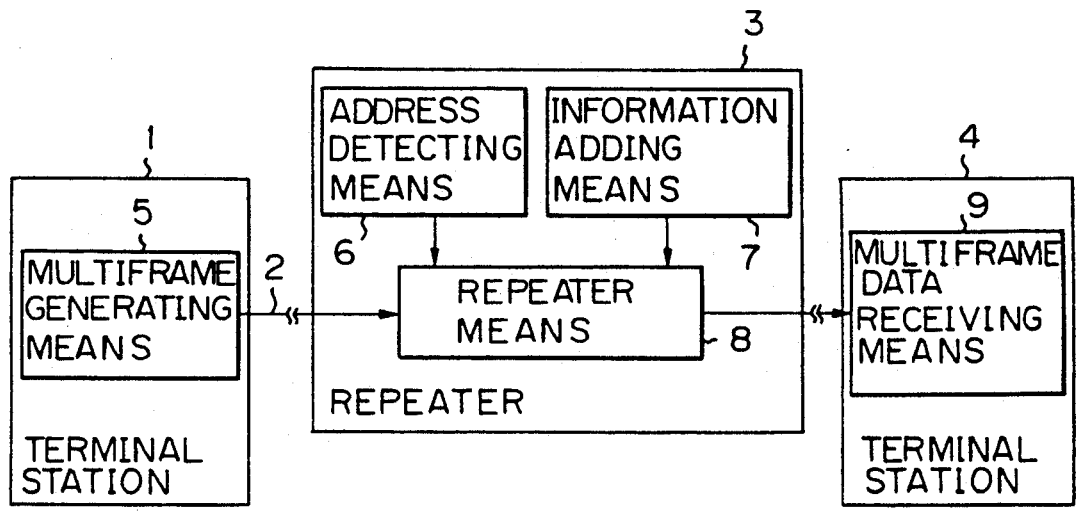
FIG. 5 shows a basic construction of the first embodiment of the present invention.

FIG. 5 shows a basic construction of the first embodiment of the present invention.

In FIG. 5, reference numerals 1 and 4 denote terminal stations, 3 denotes a repeater (note only one repeater 3 is shown as representative thereof in FIG. 5), 5 denotes a multiframe generating means, 6 denotes an address detecting means, 7 denotes an information adding means, 8 denotes a repeater means, and 9 denotes a multiframe data receiving means.

In the construction of FIG. 5, data is generated in the terminal station 1 and transmitted through the transmission line 2 to the other terminal station 4, through the repeaters 3. The repeater means 8 shown in the repeater 3 functions as a usual one-way repeater, including amplifying, shaping, and retiming, etc.

A first characteristic of the first embodiment of the present invention is that data transmitted from the terminal station 1 to the other terminal station 4 has the form of multiframe consisting of a group of consecutive frames, wherein an address of each of the repeaters is included in a corresponding one of the consecutive frames. The multiframe generating means 5 arranged in one of the terminal stations 1, generates multiframe data as above, and the multiframe data transmitted is received in the terminal station 4. The multiframe data receiving means 9 in the terminal station 4 is such that the terminal station 4 functions to receive the multiframe data in the same way as a usual terminal station in a conventional communication system wherein multiframe data is transmitted.

A second characteristic of the first embodiment of the present invention is that each of the repeaters 4 is provided with an address detecting means 6 and an information adding means 7.

The address detecting means 6 in each repeater, detects an address of the repeater, in one frame among the consecutive frames received at the repeater, to recognize a receipt of the frame corresponding to the repeater, among the consecutive frames. The information adding means 7 in each repeater, writes the current status of the repeater, in the frame which includes the address of the repeater, when the repeater receives the frame corresponding to the repeater, among the consecutive frames.

According to the first embodiment of the present invention mentioned above, first data in the form of a multiframe consisting of a group of consecutive frames, wherein an address of each of the repeaters is included in the corresponding one of the consecutive frames, is generated in the multiframe generating means 5 in at least one of the terminal stations 1, and is sent out on the transmission line 2. Next, when the multiframe from the terminal station 1 which has sent out the multiframe, reaches the first repeater (the repeater adjacent to the terminal station 1), the address detecting means 6 in the first repeater detects the address of the first repeater in one of the consecutive frames of the multiframe, and the information adding means 6 writes the current status of the first repeater in the frame in which the address of the first repeater is detected, and then the multiframe is again sent out on the transmission line 2.

When the multiframe from the above terminal station 1 reaches the second repeater (the repeater next in line after the above first repeater), the current status of the second repeater is written in the frame in which the address of the second repeater is detected, and then the multiframe is again sent out on the transmission line 2, by a the process similar to the process in the first repeater, as mentioned before.

A similar process is carried out in each of the following repeaters until, finally, the other terminal station 4 receives the multiframe data including the status of all of the repeaters located along the transmission line 2 between the two terminal stations 1 and 4, i.e., by sending multiframe data from one of the two terminal stations to the other, the other terminal station can collect the current status of all of the repeaters located along the transmission line 2 between the two terminal stations 1 and 4.

Figure 6:
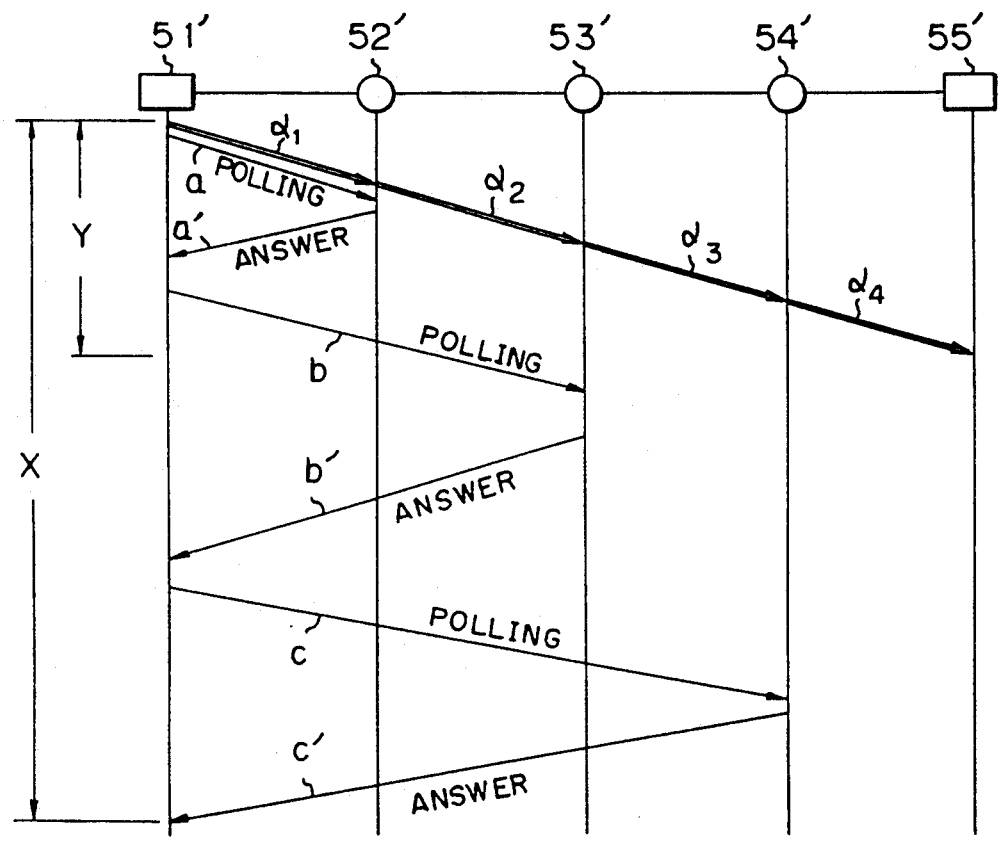
FIG. 6 shows a timing of collecting the current status information by the method for monitoring the status of a plurality of repeaters according to the first embodiment of the present invention when applied to the construction of FIG. 4, compared with the timing in the conventional method.

An example of the timing of the operation of the above first embodiment of the present invention is shown in FIG. 6. FIG. 6 shows the timing of transmission of the status of the repeaters in the construction of FIG. 4, where two terminal stations 51' and 55' are connected by a one-way transmission line 56' and one-way repeaters 52', 53' and 54' are located along the transmission line 56' which corresponds to the arrangement including only one way of the two ways of data transmission in the arrangement of FIG. 1.

In FIG. 6, an arrow $\alpha_1$ indicated by a thick line shows a path of multiframe data generated at and sent out from the terminal station 51'; an arrow $\alpha_2$ indicated by a thick line shows a path of multiframe data including data generated at the terminal station 51', and the current status of the repeater 52'; an arrow $\alpha_3$ indicated by a thick line shows a path of multiframe data including data generated at the terminal station 51', and the current status of the repeaters 52' and 53'; and an arrow $\alpha_4$ indicated by a thick line shows a path of multiframe data including data generated at the terminal station 51' and the current status of the repeaters 52', 53', and 54'. Therefore, as shown in FIG. 6, the terminal station 51 receives the current status of all repeaters 52', 53', and 54' in a time Y, which is shorter than the time X needed in the polling method in the prior art.

When a break occurs in a transmission line through which a multiframe data is to be transmitted, for example, a break has occurred between the repeaters 52' and 53' in a transmission line 56' in a direction from the terminal station 51' to 55' as shown in FIG. 4, multiframe data $\alpha_1$ generated at and sent out from the terminal station 51' can not be transmitted beyond the point of the break, and therefore, the terminal station 55' can not receive data.

Namely, in a construction wherein two terminal stations are connected by a one-way transmission line and one-way repeaters are located along the transmission line as shown in FIG. 4, when a break in the transmission line occurs between the repeaters, no information about this malfunction between the terminal stations can be obtained at the terminal stations except for the fact that a malfunction which prevents data transmission between the terminal stations has occurred, by the first embodiment of the present invention.

Figure 7:
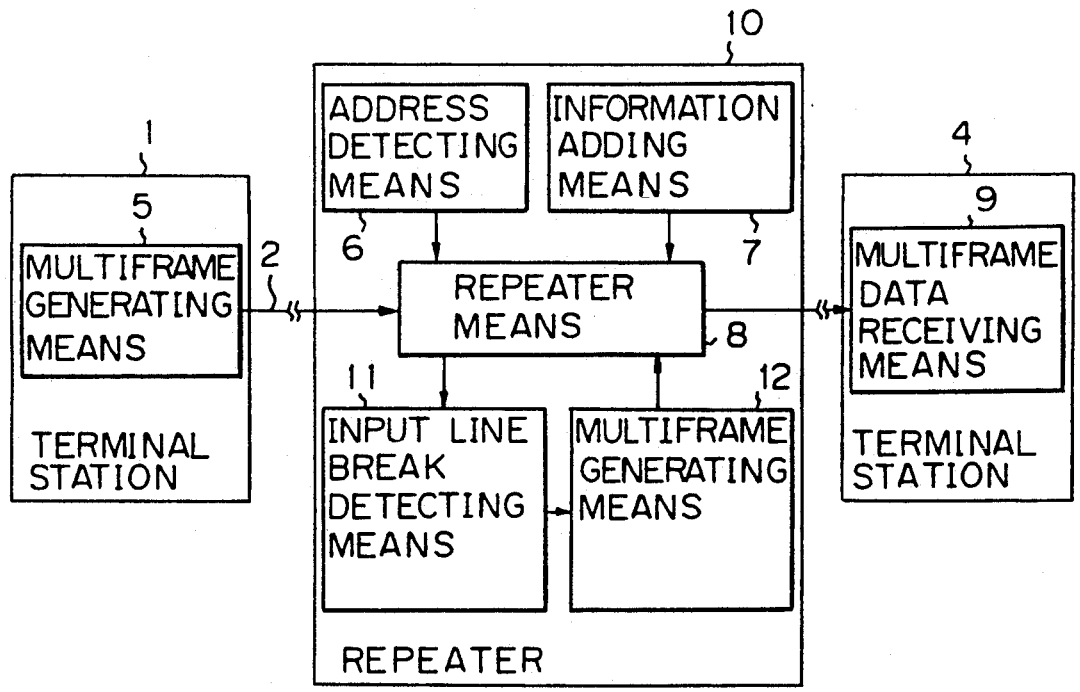
FIG. 7 shows a basic construction of the second embodiment of the present invention.

To solve the above problem, in a second embodiment of the present invention as shown in FIG. 7, each of the repeaters 10 located along the transmission line has additional means, an input line break detecting means 11 which detects a break in an input line, and a multiframe generating means 12 having basically the same function as the multiframe generating means 5 in the terminal station 1 except that the multiframe generating means 12 in each of the repeaters operates only when the break in an input line is detected by the repeater.

The operation and timing in the second embodiment of the present invention mentioned above, is explained with reference to the timing chart of FIG. 8. FIG. 8 shows the timing when the second embodiment of the present invention is applied to the construction of FIG. 3, and wherein a break has occurred in a transmission line through which multiframe data is transmitted, for example, a break between the repeaters 52' and 53' in a transmission line 56' in a direction from the terminal station 51' to 55' as shown in FIG. 4.

In FIG. 8, an arrow $\beta_1$ equals the arrow $\alpha_1$ in FIG. 6. However, the multiframe data shown by $\alpha_2$ in FIG. 6 can not be transmitted to the repeater 53' due to the break in the transmission line 56' between the repeaters 52' and 53'. Nevertheless, according to the second embodiment of the present invention, the break in the transmission line 56' between the repeaters 52' and 53' is detected by the input line break detecting means in the repeater 53'. Corresponding to the this detection, the multiframe generating means in the repeater 53' generates multiframe data, and the information adding means in the repeater 53' writes the current status of the repeater 53' in the frame which includes the address of the repeater 53' among the consecutive frames constituting the multiframe. Then the multiframe data including the current status of the repeater 53', which is shown by $\beta_3'$ in FIG. 8, is sent out on the transmission line 56'. In the repeater 54', the current status of the repeater 54' is written in the multiframe data, and then the multiframe data including the current status of the repeaters 53' and 54', which is shown by $\beta_4'$ in FIG. 8, is sent out on the transmission line 56' and reaches the terminal station 55'.

Namely, the other terminal station 55' can collect the current status of the repeaters 53' and 54' located downstream of the break point in the transmission line 56'. Further, the time needed to collect the current status of the repeaters 53' and 54' is basically the same as in the first embodiment, i.e., "Y" as shown in FIG. 8.

Further, in the third embodiment of the present invention, in addition to the process of the second embodiment of the present invention, the information adding means 6 in each of the repeaters 10 in FIG. 7, also writes an alarm indication signal (AIS), which indicates that a break has occurred in an input line, as a part of the current status of the repeater 10, in the aforementioned corresponding one of consecutive frames in the transmitted multiframe, when a break in the input line of a repeater 10 has been detected by the input line break detecting means 11 in the repeater 10.

Therefore, according to the third embodiment of the present invention, for example, in the construction of FIG. 4, when a break occurs in a transmission line 56', in the direction of transmission from the terminal station 51' to the terminal station 55', between the repeaters 52' and 53', the downstream terminal station 55 can determine the occurrence of a break between the repeaters 52' and 53' in the transmission line, as part of the current status of the repeater 53'.

The first to third embodiments of the present invention are applied to constructions wherein two terminals are connected by a one-way transmission line and a plurality of one-way repeaters are located along the transmission line to transmit data, and therefore, the current status of the repeaters is collected in only one of the two terminal stations. In particular, in the first embodiment of the present invention, no information reaches one of the terminal stations when a break in the transmission line occurs between the terminal stations.

Figure 1:
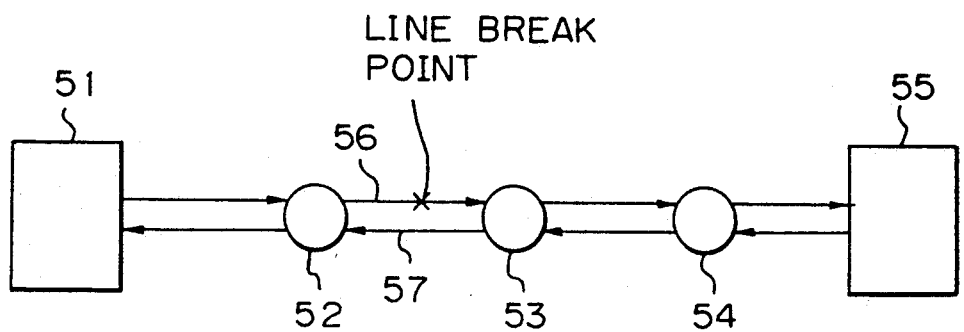
FIG. 1 shows a typical arrangement of a two-way digital data transmission system constructed between two terminal stations.

The fourth to seventh embodiments of the present invention, which will be explained in the following text, are applied to constructions wherein two terminals are connected by a pair of transmission lines (i.e., by a two-way transmission line) and a plurality of two-way repeaters are located along the pair of transmission lines to transmit data, as shown in FIG. 1. Therefore, in a normal operation, the current status of the repeaters is collected in both terminal stations.

Figure 9:
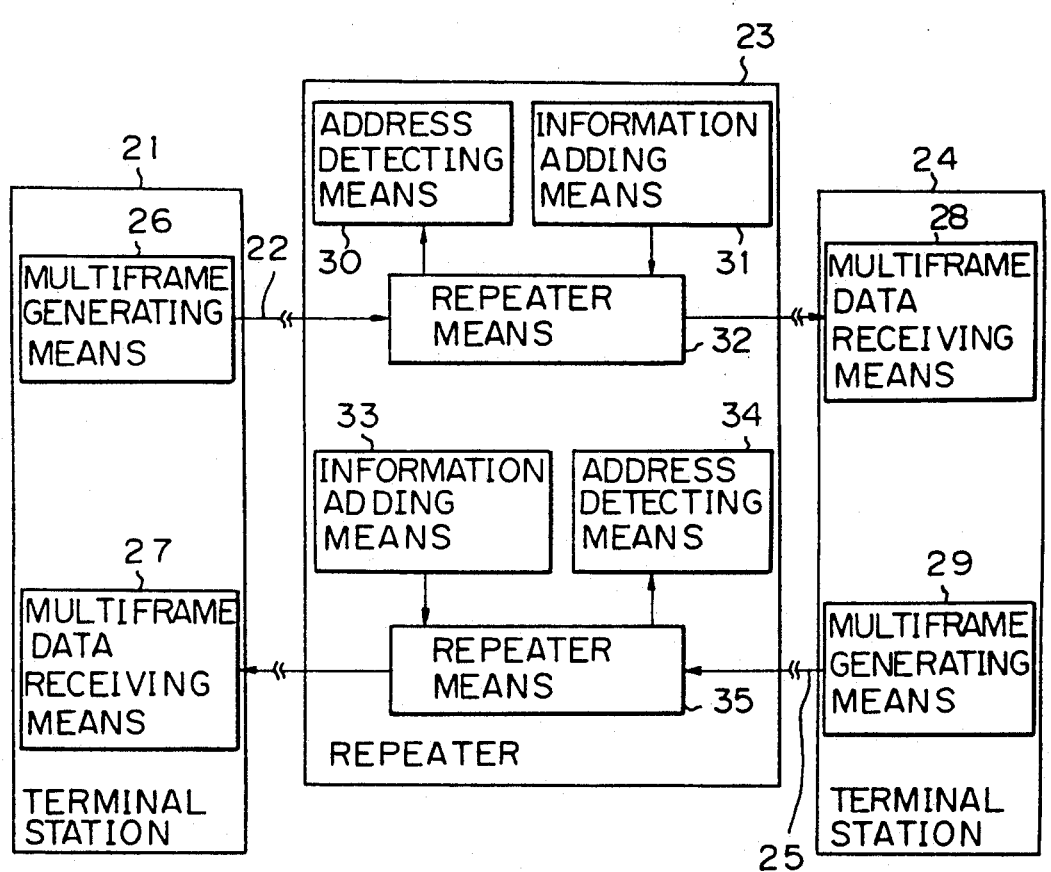
FIG. 9 shows a basic construction of the fourth embodiment of the present invention.

FIG. 9 shows a basic construction of the fourth embodiment of the present invention.

The construction for each direction of the data transmission of the fourth embodiment of the present invention shown in FIG. 9, corresponds to the construction of FIG. 5. Accordingly, in the construction of the fourth embodiment of the present invention, as shown in FIG. 9, to enable the two-way communication, each of the terminal stations 21 and 24 is provided with a multiframe generating means 26 and 29 and a multiframe data receiving means 27 and 28, respectively, and each of the repeaters 23 has a repeater means 32 and 35, an address detecting means 30 and 34, and an information adding means 31 and 33, respectively, for each direction of data transmission, and the terminal stations are connected by two transmission lines 22 and 25.

The fourth embodiment of the present invention is a system for monitoring the status of a plurality of repeaters 23 located along a pair of transmission lines 22 and 25 connecting two terminal stations 21 and 24 in both directions, wherein each of the terminal stations 21 and 24 comprises a multiframe generating means 26 and 29, which generates data in the form of a multiframe consisting of a group of consecutive frames to be sent to the other of the terminal stations 24 and 21, an address of each of the repeaters 23 being included in the corresponding one of the consecutive frames; and each of the repeaters 23 respectively comprises, for each direction of transmission of the multiframe data, an address detecting means 30 and 34 which detects the own address of the repeater 23 in one frame among the consecutive frames, to determine a receipt of the corresponding one of consecutive frames, and an information adding means 31 and 33, which writes the current status of the repeater in a frame which includes the address of the repeater, when the repeater receives the corresponding consecutive frame.

The operation and timing in the fourth embodiment of the present invention mentioned above is explained with reference to the timing chart of FIG. 8. FIG. 8 shows the timing when the fourth embodiment of the present invention is applied to the construction of FIG. 4, and wherein a break has occurred in a transmission line through which multiframe data is transmitted, for example, a break between the repeaters 52' and 53' in a transmission line 56' in a direction from the terminal station 51' to 55' as shown in FIG. 4.

In FIG. 8, an arrow $\beta_1$ equals the arrow $\alpha_1$ in FIG. 5. However, the multiframe data shown by $\alpha_2$ in FIG. 5 can not be transmitted to the repeater 53' due to the break in the transmission line 56' between the repeaters 52' and 53'. Nevertheless, according to the second embodiment of the present invention, the break in the transmission line 56' between the repeaters 52' and 53' is detected by the input line break detecting means in the repeater 53', and corresponding to the this detection, the multiframe generating means in the repeater 53' generates multiframe data, and the information adding means in the repeater 53' write the current status of the repeater 53' in the frame which includes the address of the repeater 53' among the consecutive frames constituting the multiframe. Then the multiframe data including the current status of the repeater 53', which is shown by $\beta_3'$ in FIG. 8, is sent out on the transmission line 56'. In the repeater 54', the current status of the repeater 54' is written in the multiframe data, and then the multiframe data including the current status of the repeaters 53' and 54', which is shown by $\beta_4'$ in FIG. 8, is sent out on the transmission line 56', and reaches the terminal station 55'.

According to the fourth embodiment of the present invention mentioned above, when a break in the pair of transmission lines has not occurred, the flow of data and the timing in each direction are the same as in the aforementioned first embodiment of the present invention.

Figure 2:
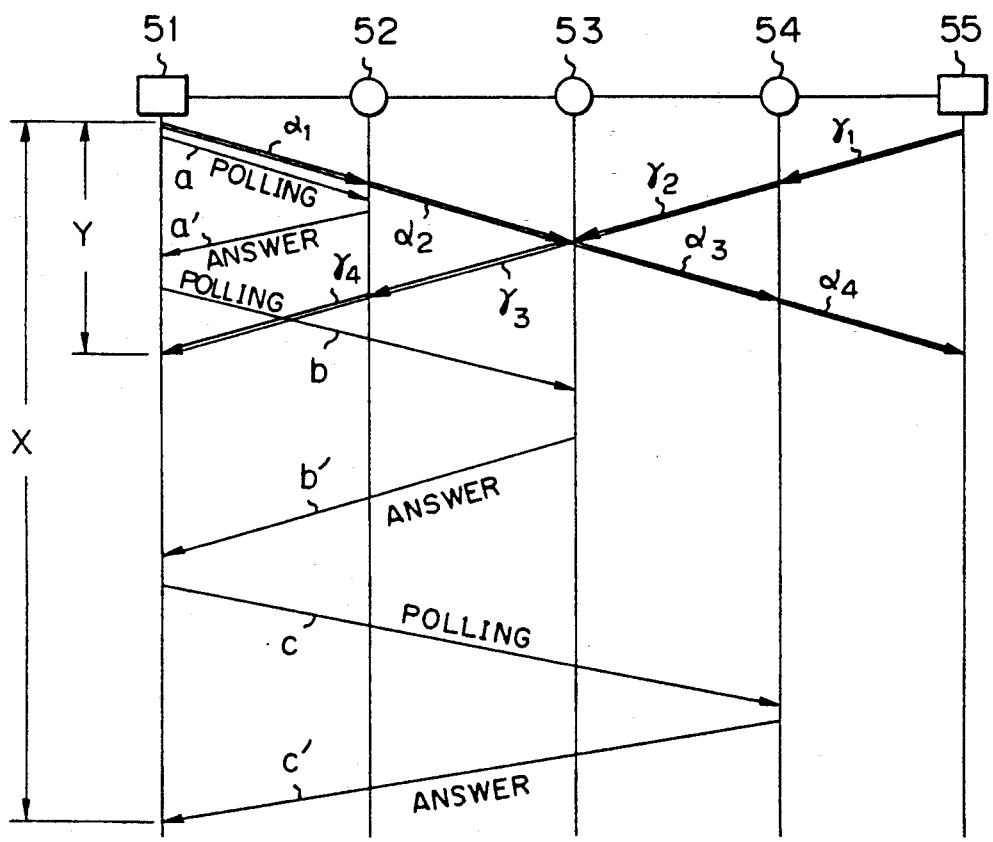
FIG. 2 shows a timing of collecting the current status information by the method for monitoring the status of a plurality of repeaters according to the fourth to seventh embodiments of the present invention when a break has not occurred in the construction of FIG. 1, compared with the timing in the conventional method.

FIG. 2 shows a timing of collecting the current status information by the method for monitoring the status of a plurality of repeaters in the fourth embodiment of the present invention, compared with the timing in the conventional method which was described before.

In FIG. 2, the meanings of arrows $\alpha_1$, $\alpha_2$, $\alpha_3$, and $\alpha_4$, are substantially equal to the meaning of the arrows $\alpha_1$, $\alpha_2$, $\alpha_3$, and $\alpha_4$ in FIG. 6 for the first embodiment of the present invention, i.e., these show multiframe data transmitted in the direction from the terminal station 51 to 55, and the meaning of arrows $\gamma_1$, $\gamma_2$, $\gamma_3$, and $\gamma_4$, are also substantially equal to the meaning of the arrows $\alpha_1$, $\alpha_2$, $\alpha_3$, and $\alpha_4$ in FIG. 6 except that the arrows $\gamma_1$, $\gamma_2$, $\gamma_3$, and $\gamma_4$ in FIG. 2 correspond to the multiframe data transmitted in the direction from the terminal station 55 to 51.

Therefore, as shown in FIG. 6, according to the fourth embodiment of present invention, both the terminal stations 51 and 55 receives the current status of all repeaters 52, 53, and 54 in a time Y, which is shorter than the time X needed in the polling method of the prior art.

However, when a break in a transmission line has occurred, for example, (see FIG. 1) between the repeaters 52 and 53 in the transmission line 56 in FIG. 1, no data reaches the terminal station 55, as mentioned in the first embodiment of the present invention, but the current status of all of the repeaters 52, 53, and 54 is collected by multiframe data transmitted from the terminal station 55 to the terminal station 51, and even the occurrence of a break in the input line at the repeater 53, detected by the repeater 53, can be collected, as a part of the current status of the repeater 53, by the multiframe data transmitted from the terminal station 55 to the terminal station 51, in the time Y.

Thus, in the fourth embodiment of the present invention, when a break has occurred in one transmission line only, although an upstream side terminal station can collect the current status of all of the repeaters between the terminal stations, a downstream side terminal station 55 can not receive data.

Further, in the fourth embodiment of the present invention, when a break occurs in both transmission lines in both directions of data transmission, for example, in the transmission lines 56 and 57 in FIG. 1, no data reaches either of the terminal stations 51 and 55.

To solve the above problem in the fourth embodiment of the present invention, the additional means similar to the additional means added to the aforementioned first embodiment to provide the aforementioned second embodiment of the present invention, are added to the fourth embodiment of the present invention, to provide the fifth embodiment thereof.

Figure 10:
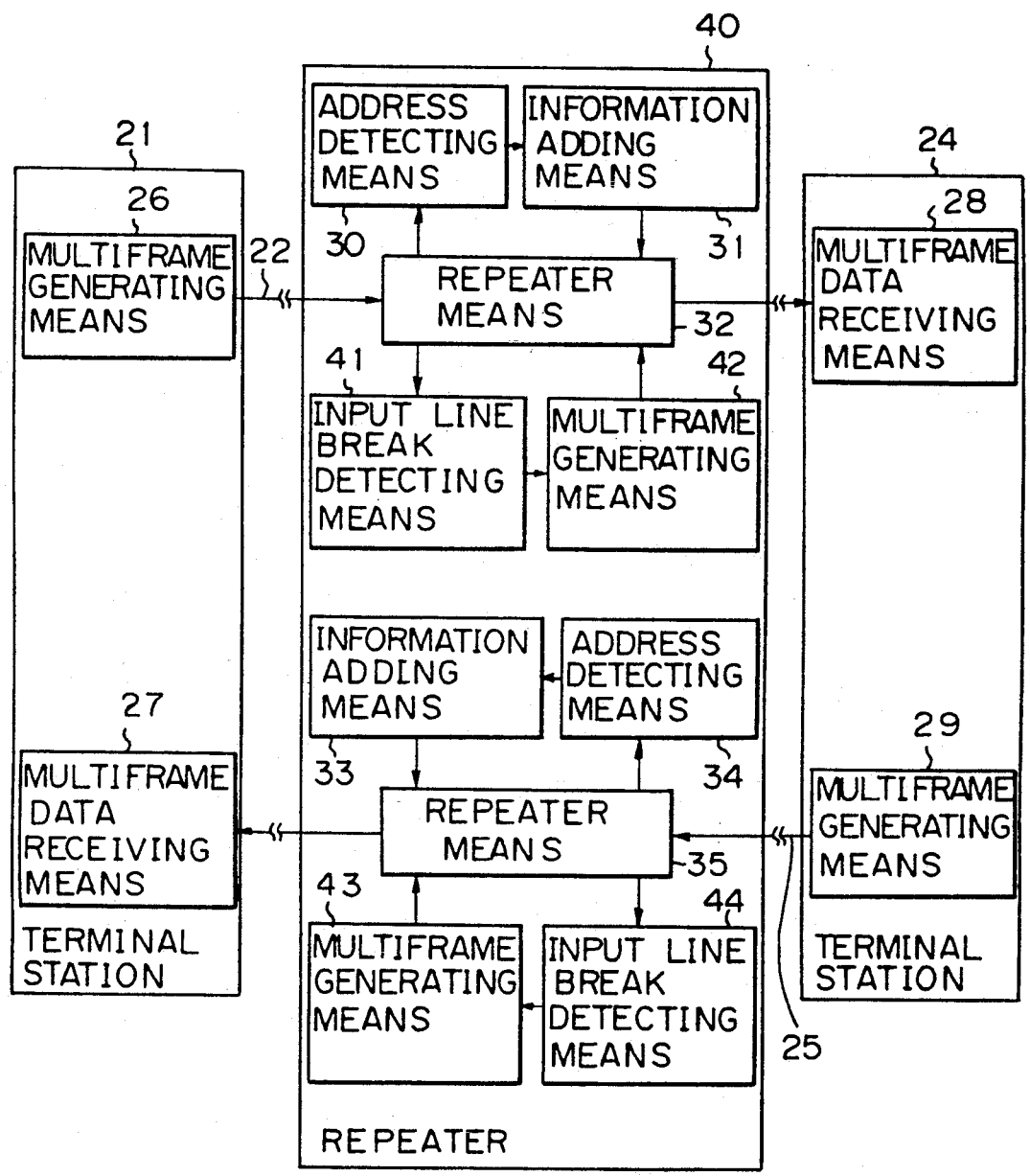
FIG. 10 shows a basic construction of the fifth embodiment of the present invention.

FIG. 10 shows a basic construction of the fifth embodiment of the present invention.

The construction for each direction of data transmission of the fifth embodiment of the present invention shown in FIG. 10 corresponds to the construction of FIG. 7, and similar to the construction of the fourth embodiment of the present invention described before, in the construction of the fifth embodiment of the present invention, as shown in FIG. 10, to enable the two-way communication, each of the terminal stations 21 and 24 also has a multiframe generating means 26 and 29 and a multiframe data receiving means 27 and 28, respectively, and each of the repeaters 40 also has a repeater means 32 and 35, an address detecting means 30 and 34, and an information adding means 31 and 32, respectively, for each direction of data transmission, and further, the terminal stations 21 and 24 are connected by two transmission lines 22 and 25. In addition, in the construction of the fifth embodiment of the present invention as shown in FIG. 10, each of the repeaters 40 respectively further has an input line break detecting means 41 and 44, and a multiframe generating means 42, 43, for each direction of data transmission.

The input line break detecting means 41 and 44 for each direction of data transmission detects a break in an input line in the corresponding direction.

The multiframe generating means 42 and 43 for each direction of data transmission in each of the repeaters 40 basically has the same function as the multiframe generating means 26 and 29 in the terminal stations 21 and 24, except that the multiframe generating means 26 and 29 in each of the repeaters 40 operates only when a break in an input line in the corresponding direction is detected in the repeater 40 by the input line break detecting means 41 and 44 for the corresponding direction of the data transmission.

Figure 3:
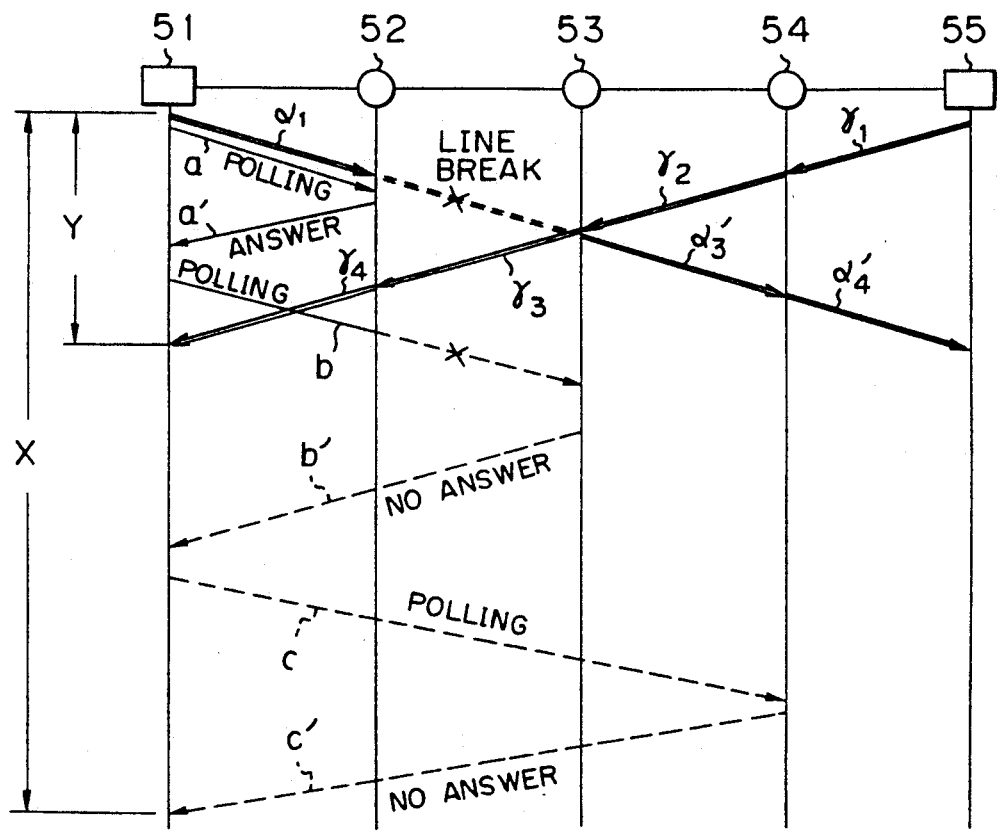
FIG. 3 shows a timing of collecting the current status information by the method for monitoring the status of a plurality of repeaters according to the fourth to seventh embodiments of the present invention when a break has occurred in the construction of FIG. 1, compared with the timing in the conventional method.

FIG. 3 shows the timing when the fifth embodiment of the present invention is applied to the construction of FIG. 4, and wherein a break has occurred between the repeaters 52 and 53 in a transmission line 56 in a direction from the terminal station 51 to 55 as shown in FIG. 4, compared with the conventional method described before.

In FIG. 3, an arrow $\alpha_1$ equals the arrow $\alpha_1$ in FIG. 2. However, the multiframe data shown by $\alpha_2$ in FIG. 2 can not be transmitted to the repeater 53 due to the break in the transmission line 56 between the repeaters 52 and 53. Nevertheless, according to the fifth embodiment of the present invention, the break in the transmission line 56 between the repeaters 52 and 53 is detected by the input line break detecting means in the repeater 53, and corresponding to the this detection, the multiframe generating means in the repeater 53 generates multiframe data, and the information adding means in the repeater 53 writes the current status of the repeater 53 in the frame which includes the address of the repeater 53 among the consecutive frames constituting the multiframe transmitted in the direction from the terminal station 51 to 55. Then the multiframe data including the current status of the repeater 53, which is shown by $\alpha_3'$ in FIG. 3, is sent out on the transmission line 56. In the repeater 54, the current status of the repeater 54 is written in the multiframe data, and then the multiframe data including the current status of the repeaters 53 and 54, which is shown by $\alpha_4'$ in FIG. 3, is sent out on the transmission line 56, and reaches the terminal station 55.

The operation of the data transmission in the direction from the terminal station 55 to 51, and collection of the current status of the repeaters 52, 53, and 54 by the terminal station 51, using the multiframes shown by $\gamma_1$, $\gamma_2$, $\gamma_3$, and $\gamma_4$ in FIG. 3, is the same as the operation shown by the same symbols in FIG. 2.

Figure 11:
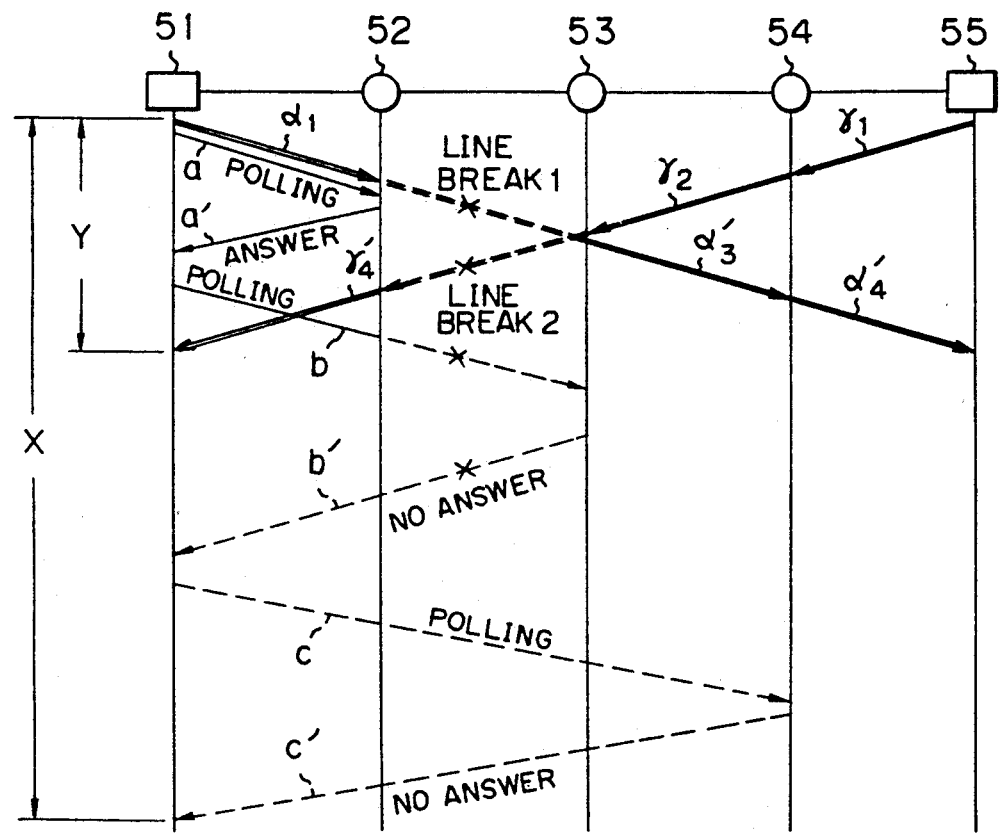
FIG. 11 shows the timing when the fifth embodiment of the present invention is applied to the construction of FIG. 4, and wherein a break occurs in both the transmission lines 56 and 57, for example, between the repeaters 52 and 53, compared with the conventional method.

FIG. 11 shows the timing when the fifth embodiment of the present invention is applied to the construction of FIG. 4, and wherein a break has occurred in both transmission lines 56 and 57, and for example, between the repeaters 52 and 53, compared with the conventional method described before.

In FIG. 11, the operation regarding the multiframe data transmitted in the direction from terminal station 51 and 55 shown by the arrows $\alpha_1$, $\alpha_3'$, and $\alpha_4'$, is the same as the operation mentioned above with reference to FIG. 3.

As readily understood from the similarity of the abovementioned operation shown by the arrows $\alpha_1$, $\alpha_3'$, and $\alpha_4'$ and the operation shown by the arrows $\gamma_1$, $\gamma_2'$, and $\gamma_4'$ in FIG. 3, the operation for the multiframe data transmitted in the direction from terminal station 55 and 51 shown by the arrows $\gamma_1$, $\gamma_2'$, and $\gamma_4'$, is carried out in the same way as the operation for the multiframe data transmitted in the direction from terminal station 51 and 55 shown by the arrows $\alpha_1$, $\alpha_3'$, and $\alpha_4'$.

Thus, when a break has occurred in one transmission line, refer to FIG. 3, according to the fifth embodiment of the present invention, even when a break has occurred in both of the transmission lines connecting the two terminal stations, for each transmission line, the current status of the repeaters located downstream of the break point is collected at the downstream terminal station in the time Y, as shown in FIG. 11.

In the sixth embodiment of the present invention, in addition to the construction of the fifth embodiment of the present invention, the information adding means 31 and 33 for each direction of data transmission also writes an alarm indication signal (AIS) which indicates the occurrence of a break in an input line in the corresponding direction of data transmission, as a part of the current status of the repeater, in the corresponding one of consecutive frames (the frame corresponding to the repeater) in the multiframe transmitted in the corresponding direction, when the input line of the repeater, in the corresponding direction of the data transmission, broke.

According to the sixth embodiment of the present invention, when a break has occurred in a transmission line, for example, in the direction of transmission from the terminal station 51 to the terminal station 55 between the repeaters 52 and 53 as shown in FIG. 1, the break is detected by an input line break detecting means in the corresponding direction of transmission, and the information for the break (an alarm indication signal) is then written in the multiframe data in the corresponding direction of transmission by the information adding means corresponding to that direction. Therefore, the terminal stations 55 downstream of the break can determine that a break in the transmission line has occurred between the repeaters 32 and 33, as a part of the current status information.

Further, in the seventh embodiment of the present invention, in addition to the construction of the fifth embodiment of the present invention, the information adding means for each direction of data transmission also writes an alarm indication signal which indicates the occurrence of a break in an input line in each direction of data transmission, as a part of the current status of the repeater, in the corresponding one of consecutive frames (the frame corresponding to the repeater) in the multiframe transmitted in each direction, when a break occurs in the input line of the repeater in each direction of data transmission.

According to the seventh embodiment of the present invention, when a break has occurred in a transmission line, for example, in the direction of transmission from the terminal station 51 to the terminal station 55 between the repeaters 52 and 53 as shown in FIG. 1, the break is detected by an input line break detecting means in the corresponding direction, and the information for the break (an alarm indication signal) is then written in the multiframe data in both directions by the information adding means corresponding to both directions of transmission. Therefore, both of the terminal stations 51 and 55 can determine the occurrence of a break in the transmission line between the repeaters 52 and 53, as a part of the current status of the repeater 53.

Consequently, in any embodiment of the present invention, as shown in FIGS. 4, 7, 9 and 10, all or a part of the current status (the status information which can be obtained under a line condition by each embodiment of the present invention) of the repeaters located along the transmission line, can be collected almost in the time needed for multiframe data sent from one terminal station to reach the other terminal station through the transmission line connecting the terminal stations and the repeaters, and the time required for collecting status information to be monitored is remarkably reduced, in comparison with the conventional polling method.

As a most preferred embodiment of the present invention, the seventh embodiment thereof is explained hereinafter, because all functional means constituting each of the first to sixth embodiments of the present invention are included in this seventh embodiment, and therefore, it will be clear that the first to sixth embodiments of the present invention can be easily modified in practice.

FIGS. 12 and 13 each show an example of the format of the multiframe data transmitted in the present invention.

The multiframe data shown in FIG. 12 consists of n consecutive frames F1, F2, . . . Fi, . . . Fn, and each frame Fi (i=1~n) provides twenty-four time slots for twenty-four data channels DATA1, DATA2, . . . DATAj, . . . DATA24, and another three time slots for a frame synchronization pattern FLM, a time slot for an address ADDi, and a time slot for service bits SBi, where each time slot consists of 6 bits.

The above time slot for an address ADDi for each frame Fi (i=1~n) is a realization of one of the aforementioned characteristics of the present invention, i.e., in each time slot for an address ADDi for each frame Fi (i=1~n) is written the address of the corresponding repeater located along the transmission line, and the time slot for service bits SBi (i=1~n) is used to write the current status of the corresponding repeater located along the transmission line.

The multiframe data shown in FIG. 13 also consists of n consecutive frames F1', F2', . . . Fi', . . . Fn', and each frame Fi' (i=1~n) provides thirty-three time slots for thirty-three data channels DATA1, DATA2, . . . DATAj, . . . DATA32, and another four time slots for a frame synchronization pattern FLM, and three time slots for service bits SBik (k=1~3).

Figure 14:
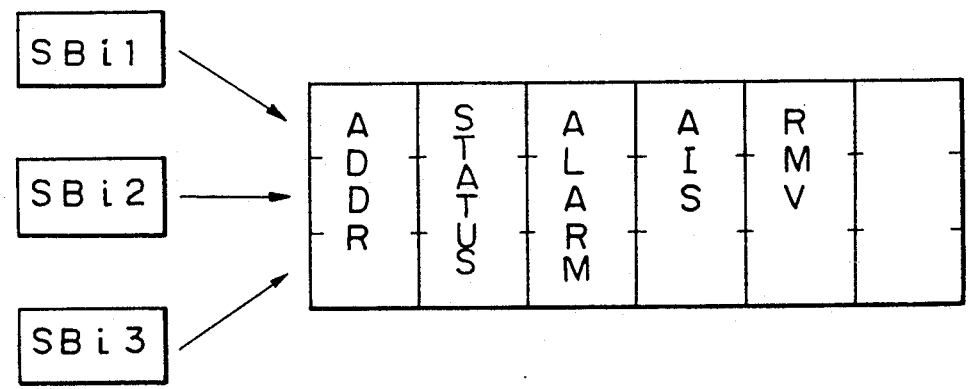
FIG. 14 shows an example of the format of the service bits region in the format of FIG. 12.

A more detailed construction of the above service bits SBik (k=1~3) is shown in FIG. 14. As shown in FIG. 14, in each frame Fi' (i=1~n), all bits of the above three time slots SBik (k=1~3) are combined, and then the combined data as shown at the right of FIG. 14, then includes an address region ADDR, a status region STATUS, an alarm region ALARM, an alarm indication signal (AIS) region AIS, and a unit removal indication region RMV, etc.

The above address region ADDR in each frame Fi' in the multiframe of FIG. 13, plays the same role as the time slot for an address ADDi in each frame Fi in the multiframe of FIG. 12.

In the status region STATUS, the status of whether the repeater is switched to the normal line or the standby line is written by the information adding means in each of the repeaters.

In the alarm region ALARM, the alarm status of the repeater, e.g., a power failure, or a break in the input lines (including the corresponding line and the opposed line), etc., is written by the information adding means in each of the repeaters.

In the alarm indication signal (AIS) region AIS, the alarm status of whether the repeater has detected a break in the input of the corresponding line, is written by the information adding means in each of the repeaters.

In the unit removal indication region RMV, the status of whether or not any removable units which constitute the repeater has been removed is written by the information adding means in each of the repeaters.

Figure 15:
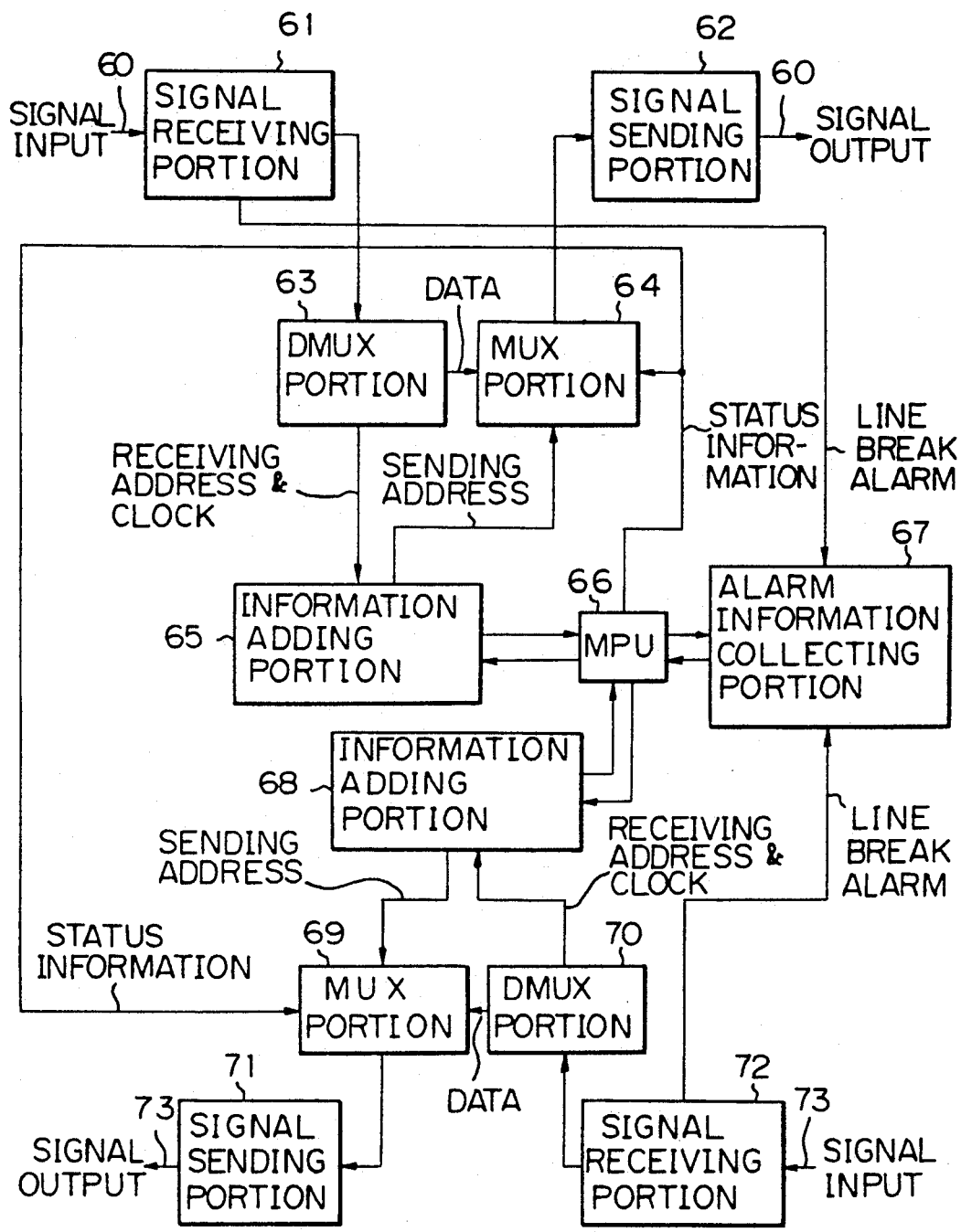
FIG. 15 shows the construction of the repeater in an embodiment of the present invention.

FIG. 15 shows a hardware construction of the repeater used in the embodiments of the present invention.

In FIG. 15, reference numerals 60 and 73 denote optical signal transmission lines, 61 and 72 denote signal receiving portions, 62 and 71 denote signal sending portions, 63 and 70 denote demultiplexing portions, 64 and 69 denote multiplexing portions, 65 and 68 denote information adding portions, 66 denotes an MPU (microprocessor unit), and 67 denotes an alarm information collecting portion.

The optical signal transmission line 60, signal receiving portion 61, signal sending portion 62, demultiplexing portion 63, multiplexing portion 64, and information adding portion 65 are provided for the data transmitted from left to right in the drawing, and optical signal transmission line 73, signal receiving portion 72, signal sending portion 71, demultiplexing portion 70, multiplexing portion 69, and information adding portion 68 are provided for the data transmitted from right to left in the drawing.

The multiframe data in the form of optical signals is transmitted on the transmission line 60, and serially input to the signal receiving portion 61. The optical signals are then transformed to corresponding electric signals and input to the demultiplexing portion 63. In the demultiplexing portion, the aforementioned address ADDi (i=1~n) in FIG. 12 or ADDR in FIG. 13, and the other service bits SBi (i=1~n) in FIG. 12 or SBik (i=1~n, k=1~3) in FIG. 13, are separated from the other portion, i.e., DATA portion.

The above address ADDi (i=1~n) in FIG. 12 or ADDR in FIG. 13, and the other service bits SBi (i=1~n) in FIG. 12 or SBik (i=1~n, k=1~3) in FIG. 13, are input to the information adding portion 65, with the clock pulse first extracted from the above receiving signals, and then supplied through the demultiplexing unit 63 to all other portions of the repeater to synchronize the operation therein.

The alarm information collecting portion 67 collects the alarm status of the repeater, e.g., a power alarm status, an optical alarm status, or a unit removal alarm status, etc., from the corresponding portions whereat the alarm statuses are detected. The object of the present invention is not the detection of these alarm status, but how or how fast to send these alarm statuses to the terminal stations. Since the detection of these alarm status is a well known process, e.g., the optical alarm status due to a break in the input line can be detected by monitoring the level of electric signals transformed from the optical input signals at the signal receiving portion 61.

Figure 16:
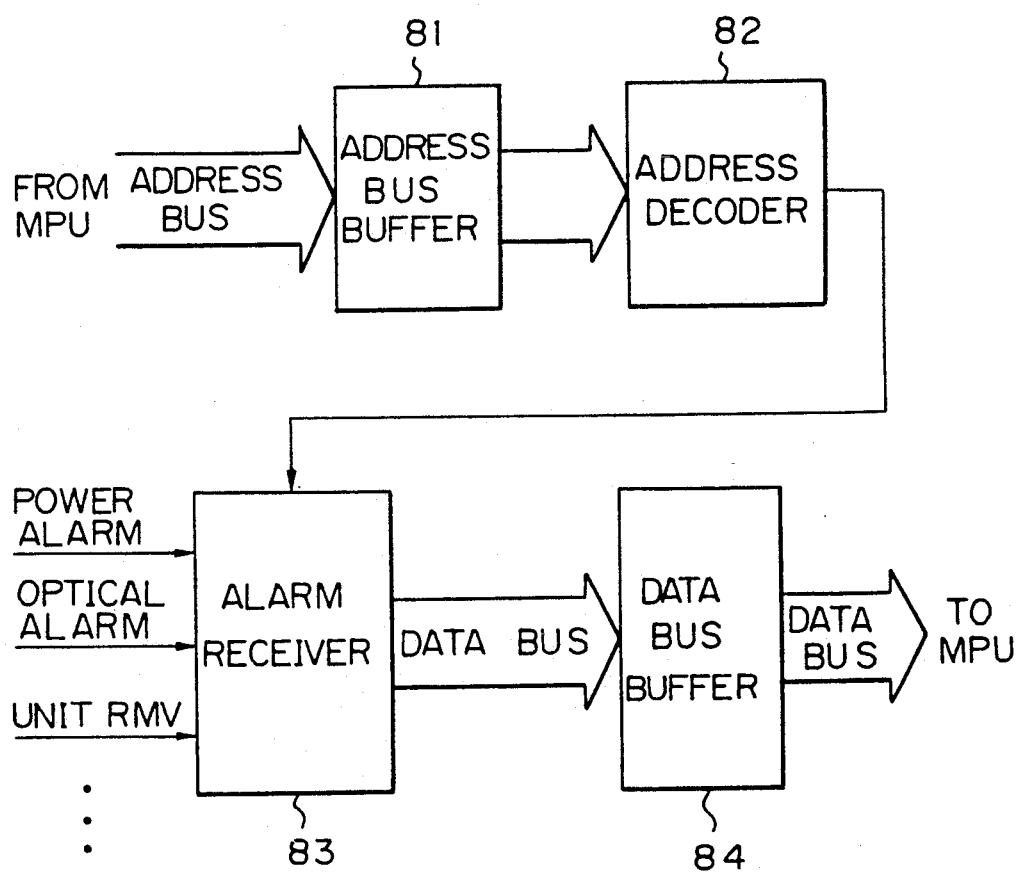
FIG. 16 shows the construction of the alarm status information collecting portion in an embodiment of the present invention.

A concrete example of the construction of the alarm information collecting portion 67 is shown in FIG. 16.

In FIG. 16, reference numeral 81 denotes an address bus buffer, 82 denotes a decoder, 83 denotes an alarm receiver, and 84 denotes a data bus buffer.

In the alarm receiver 83, various alarm status signals, as mentioned above, are collected from the abovementioned (alarm detecting) portions, and then each of the collected status signals is then delivered to the corresponding bit in the data bus, and finally, is input to the MPU 66, under the control of the MPU 66 where the MPU 66 controls all portions of the repeater.

To carry out the above delivery, the MPU 66 outputs the required address signal through the address bus, and the address signal is then input to the address decoder 82 through the address bus buffer 81. The output of address decoder 82 is used to control the above alarm receiver 43.

Figure 17:
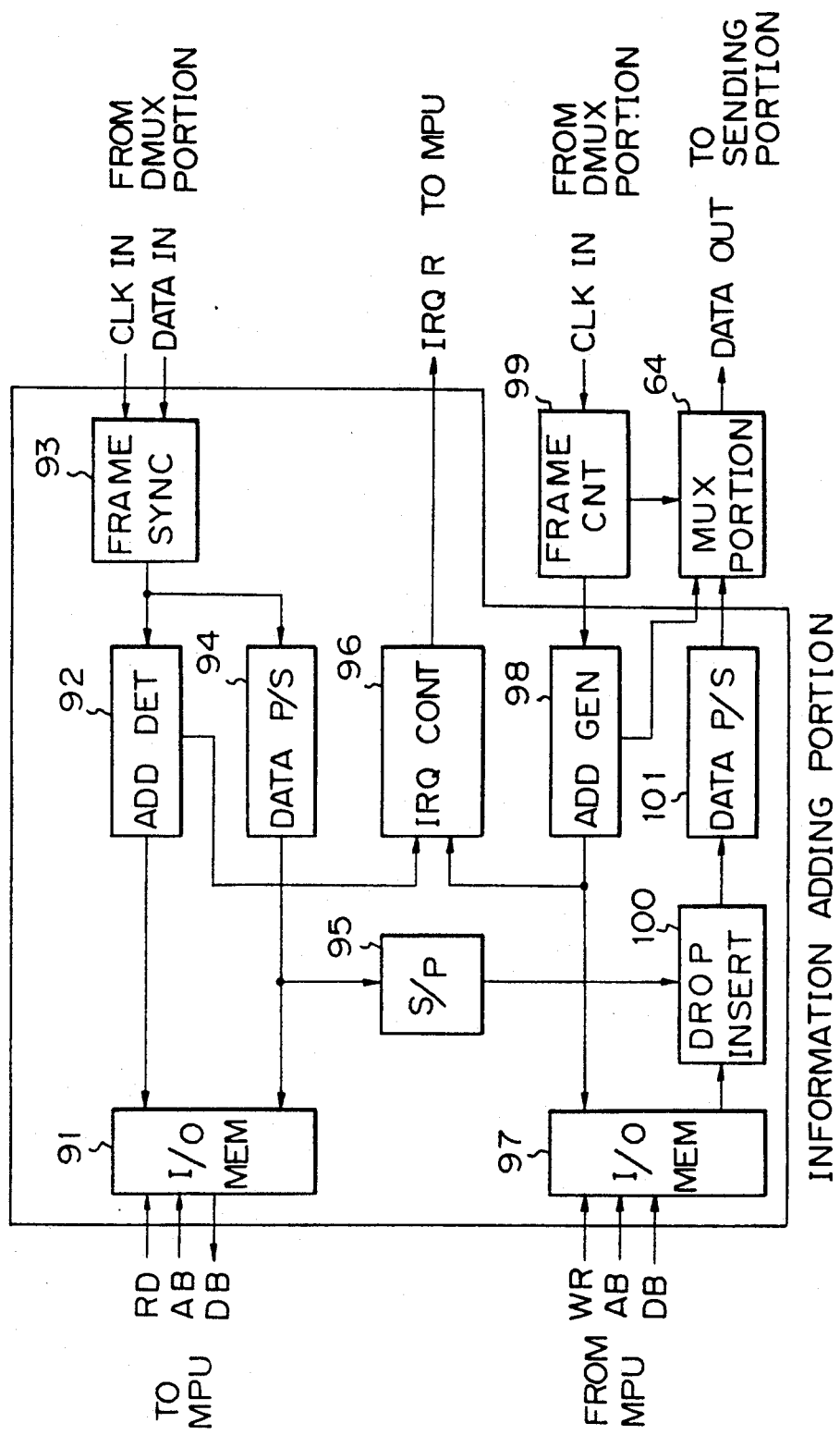
FIG. 17 shows the construction of the information adding portion in an embodiment of the present invention.

A concrete example of the construction of the information adding portion 65 is shown in FIG. 17.

In FIG. 17, reference numerals 91 and 92 denote I/O memories, 92 denotes an address detecter, 93 denotes a frame synchronizing circuit, 94 and 101 denote parallel to serial transforming circuits, 95 denotes a serial to parallel transforming circuit, 96 denotes an interrupt request controller, 98 denotes an address generator, 99 denotes a frame controller, 100 denotes a drop insert circuit, and 64 denotes the multiplexing portion shown in FIG. 15.

The aforementioned address ADDi (i=1~n) in FIG. 12 or ADDR in FIG. 13, and the other service bits SBi (i=1~n) in FIG. 12 or SBik (i=1~n, k=1~3) in FIG. 13, separated from the DATA portion in the demultiplexing portion 63, and the aforementioned clock, are input to the frame synchronizing circuit 93, and thereat, each of the address data and the service bits is synchronized with the clock, and the address data is then output in parallel to the address detecter 92, and both the address data and the service bits are transformed again to serial data through the parallel/serial transforming circuit 94.

The address detecter 92 holds the address of the repeater itself, and detects the corresponding frame Fi or Fi' including the same address, by comparing the above input address ADDi or ADDR with the address of the repeater itself.

When the address is not detected, all data separated in the demultiplexing portion 63, synchronized at the frame synchronizing circuit 93, and then transformed to a serial form, is then transferred through the serial to parallel transforming circuit 95, the drop insert circuit 100, and the serial to parallel transforming circuit 101, to the multiplexing portion 64. The function of the drop insert circuit 100 is basically an OR logic of the corresponding bits of the output of the serial to parallel transforming circuit 95 and the output of the I/O memory 97, mentioned later. Namely, the address data and the service bits in the frames which does not include the address of the repeater, pass the information adding circuit 65, and are sent out again in the same state as received.

When the address of the repeater is detected in the address detecting portion 92, i.e., the corresponding frame is detected in the multiframe data received, the address detecter 92 outputs an interrupt request signal to the interrupt request controller 96. Corresponding to the interrupt request signals, the interrupt request controller 96 outputs an IRQ request signal to the MPU 66.

The MPU 66 prepares the current status information data to be sent to the terminal station by writing it in the corresponding frame which includes the address of the repeater, and outputs the current status information data through the I/O memory 97, which acts as a buffer, where the current status information data prepared by the MPU 66 includes the alarm status information collected in the alarm information collecting portion 67, as mentioned before.

Corresponding to the IRQ request signal, the MPU 66 also controls the timing of the reading out of the current status information that the status information data, is input to the multiplexing portion 64 through the drop insert circuit 100 at an appropriate timing, and thus, the current status information data is output in the corresponding time slot in the corresponding frame in the multiframe data to be output to the terminal station.

When a break in the input line is detected in the signal receiving portion 61, the alarm information showing an input line break, i.e., the optical alarm status signal is transferred to the MPU 66 through the alarm information collecting portion 67, while the system clock which is supplied to all the portions of the repeater to synchronize same, is switched to the master clock generated in the master clock generator usually provided in the demultiplexing portion 63 (not shown).

Corresponding to the above alarm information, the MPU 66 begins to control the information adding portion 65 and the multiplexing portion 64 so that multiframe data is generated and sent out to the downstream side.

To generate the addresses of all of the repeaters located along the transmission line, to be included in the consecutive frames which constitute a multiframe, the MPU 66 controls the address generator 98 in the information adding portion 65 to generate the above addresses. The timing of the output of each address is given by the frame controller 99, which sends a timing signal having a cycle time corresponding to the cycle time of each frame in the multiframe so that the output of the address generator 98, which is input to the multiplexing unit 64, is renewed for each frame. The timing signal is generated by dividing the master clock supplied from the demultiplexing portion 63.

The output of the address generator is also input to the interrupt request controller 96, and correspondingly, the interrupt request controller 96 outputs the IRQ request signal to the MPU 66. Corresponding to the IRQ request signal, the MPU 66 controls the timing of the reading out of the current status information data stored in the I/O memory 97 so that the current status information data is input to the multiplexing portion 64 through the drop insert circuit 100 at an appropriate timing, and thus the current status information data is output at the corresponding time slot in the corresponding frame in the multiframe data to be output to the terminal station.

In the above, the construction consisting of optical signal transmission line 60, signal receiving portion 61, signal sending portion 62, demultiplexing portion 63, multiplexing portion 64, information adding portion 65, and alarm information collecting portion 67 and MPU 66, mainly corresponding to a data transmission from left to right in the drawing, are described, but, a similar description can be applied to the construction consisting of optical signal transmission line 73, signal receiving portion 72, signal sending portion 71, demultiplexing portion 70, multiplexing portion 69, information adding portion 68, and alarm information collecting portion 67 and MPU 66, mainly corresponding to a data transmission from right to left in the drawing.

In the above construction, when a break in the input line of a transmission line is detected, the MPU 66 prepares the alarm indication signal (AIS) as a part of the current status information to be sent to the terminal station downstream of the transmission line in which the break has occurred, and therefore, the aforementioned sixth embodiment of the present invention is realized.

Further, in the above construction, when a break in the input line of a transmission line is detected, the MPU 66 prepares the alarm indication signal (AIS) as a part of the current status information to be sent to both terminal stations, indicating the transmission line in which the break occurred. This is possible because a plurality of (three) bits are provided for the alarm indication signal (AIS) as shown in FIG. 14. Accordingly, the aforementioned seventh embodiment of the present invention is realized.

I claim:

1. A system for monitoring status of a plurality of repeaters located along a transmission line connecting two terminal stations, wherein at least one of said terminal stations and at least one of said repeaters comprises:
    multiframe generating means for cyclically generating multiframe data including a plurality of frames containing addresses of all the repeaters, each frame comprising an address of a corresponding repeater along the transmission line, data and status of the repeater;
    and wherein each of said repeaters comprises:
    address detecting means for detecting an address of repeater from the multiframe data and for determining a receipt of the multiframe data;
    information adding means for writing current status of the repeater in the multiframe data;
    input line break detecting means for detecting a break in the transmission line; and
    said multiframe generating means for cyclically generating second multiframe data in response to said input line break detecting means detecting a break in the transmission line.

2. A system according to claim 1, wherein said information adding means includes:
    means for writing an alarm indication signal which indicates the break in the transmission line, as a part of the current status of each of the repeaters in the multiframe data when a break occurs in the transmission line.

3. A one-way repeater operatively connectable to an input line, comprises:
    means for receiving consecutive frames;
    address detecting means for detecting a predetermined address in a frame among the consecutive frames;
    information adding means for writing current status information in the frame in which the predetermined address is detected;
    input line break detecting means for detecting a break in the input line; and
    multiframe generating means for generating multiframe data in responsive to a break in the input line being detected by said input line break detecting means.

4. A one-way repeater according to claim 3, wherein said information adding means includes:
    means for writing an alarm indication signal which indicates the break in the input line, as a part of the current status information, in the frame in which the predetermined address is detected, when the break occurs in the input line.

5. A system for monitoring status of a plurality of repeaters located along a two-way transmission line connecting two terminal stations, wherein at least one of said terminal stations and at least one of said repeaters comprises:
    multiframe generating means for cyclically generating multiframe data including a plurality of frames containing addresses of all the repeaters, each frame comprising an address of a corresponding repeater along the transmission line, data and a status of the repeater and for sending multiframe data in each direction of transmission of multiframe data;
    and wherein each of said repeaters comprises:
    address detecting means for detecting an address of repeater from the multiframe data and for determining a receipt of the multiframe data;
    information adding means for writing current status of the repeater in the multiframe data;
    input line break detecting means for detecting a break in the transmission line; and
    said multiframe generating means for generating second multiframe data in response to said input line break detecting means detecting a break in the transmission line.

6. A system according to claim 5, wherein said information adding means includes:
    means for writing an alarm indication signal which indicates the break in one of the transmission lines in when a break has been detected in one of the input lines.

7. A system according to claim 5, wherein said information adding means includes:
    means for writing an alarm indication signal which indicates the break in one of the transmission lines, as a part of the current status of each of the repeaters when a break has been detected in the one of the transmission lines.

8. A two-way repeater operatively connectable to a pair of transmission lines, comprises:
means for receiving consecutive frames;
address detecting means for detecting a predetermined address in a frame among consecutive frames;
information adding means for writing current status information in the frame which includes the predetermined address;
input line break detecting means for detecting a break in one of the transmission lines; and
multiframe generating means for generating multiframe data in response to a break in one of the transmission lines being detected by said input line break detecting means.

9. A two-way repeater according to claim 8, wherein said information adding means includes:
means for writing an alarm indication signal which indicates a break in the one of the transmission lines as a part of the current status information, in the frame in which the predetermined address is detected when a break has been detected in the one of the transmission lines.

10. A two-way repeater according to claim 8, wherein said information adding means includes:
means for writing an alarm indication signal which indicates a break in one of the transmission lines, as a part of the current status information, in the frame in which the predetermined address is detected when a break has been detected in one of the transmission lines in each direction of data transmission.

* * * * *